July 19, 1949.
C. C. STEVENS
2,476,515
SPINDLE MOUNTING AND DRIVING UNIT
Original Filed Sept. 24, 1943
2 Sheets-Sheet 1
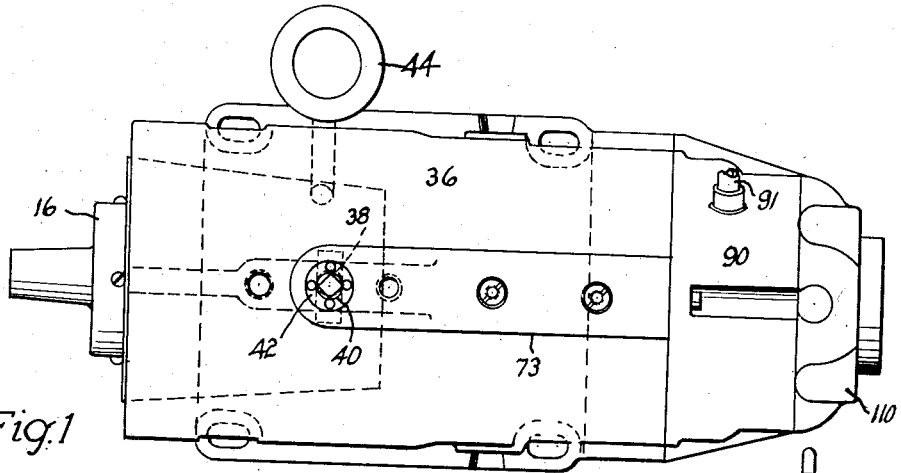
Fig.1
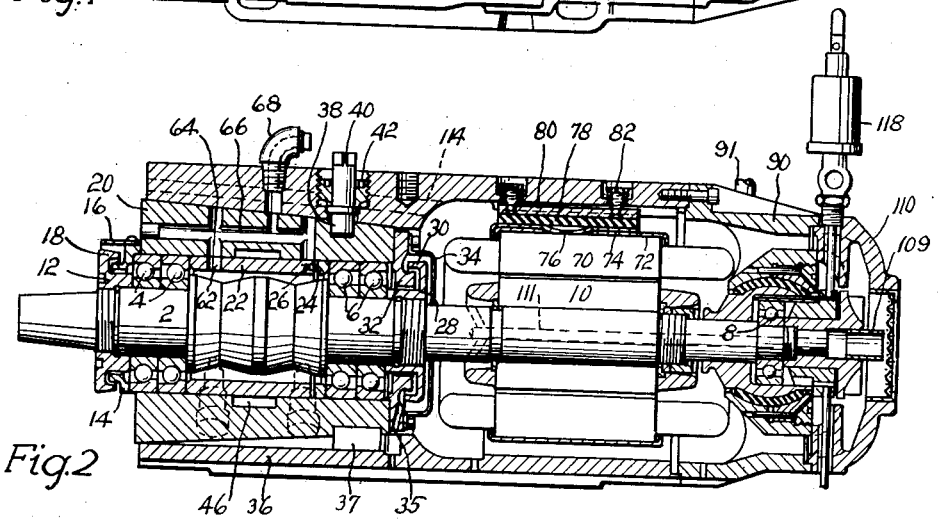
Fig.2
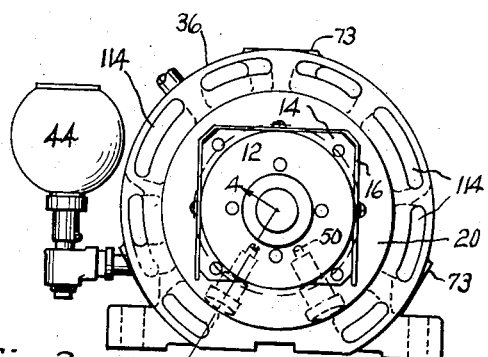
Fig.3
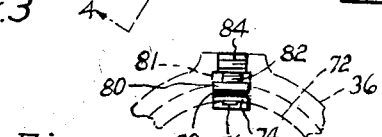
Fig.6
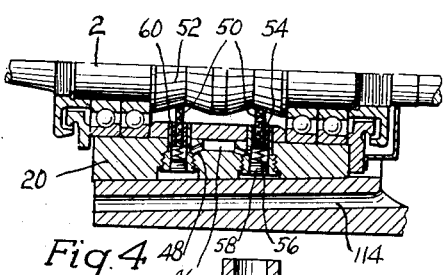
Fig.4
Fig.5
INVENTOR:
CLARENCE C. STEVENS,
BY Romeyn A. Spare
HIS ATTORNEY.

INVENTOR:
CLARENCE C. STEVENS,
BY Romeyn A. Spare
HIS ATTORNEY.

Patented July 19, 1949

2,476,515

UNITED STATES PATENT OFFICE 2,476,515

SPINDLE MOUNTING AND DRIVING UNIT

Clarence C. Stevens, Forestville, Conn., assignor to General Motors Corporation, Detroit, Mich., a corporation of Delaware Original application September 24, 1943, Serial No. 503,610. Divided and this application March 25, 1946, Serial No. 656,835

12 Claims. (Cl. 171—252)

This invention relates to a spindle mounting and driving unit, especially for a high speed grinding wheel, and comprises all of the features of novelty herein disclosed. This application is a division of my application Serial Number 503,610, filed September 24, 1943, Patent 2,416,886, March 4, 1947.

To obtain the high quality of ground surfaces required by modern precision antifriction bearings, it is important to have a very smooth running grinding spindle which is free from vibration, chatter, whip and other disturbances which tend to become aggravated at the exceedingly high speed at which such spindles should run. Belt pull has been one undesirable factor in some installations and, to avoid this, it has been a practice to mount a grinding spindle on one set of bearings, a driving spindle or motor shaft on another set of bearings and couple the spindles together. Difficulties arise in aligning these spindles and in aligning the coupling with the two spindles. There may be out-of-balance conditions in the coupling, in the wheel spindle or in the motor spindle with its rotor and cooling fan assembly. Any lack of uniformity in the air gap between rotor and stator creates electrical disturbances with resultant vibration and lack of uniformity in the power input. A rough running motor will produce rough work even when used with a smooth running wheel spindle and a rough running spindle will not produce good work no matter how smooth the motor runs. Also the bad conditions are aggravated by the interposed coupling and any misalignment in the units. Another disturbing factor which effects the desired smooth running has been temperature rise due to motor heat and to heat developed at the contact areas between the balls and their races in both the wheel spindle unit and in the motor spindle unit. Lubrication is also a problem.

An object of the invention accordingly is to provide a high speed grinding spindle and drive which will avoid the faults of prior constructions. The coupling is eliminated by the present one-unit construction wherein a single sturdy spindle of increased strength carries both the grinding wheel and the rotor or driving means. Temperature rise is minimized by improved and more copious air circulation as afforded by increased space around the stator between the stator supports and by better dissipation of heat from the spindle housing. Electrical disturbances and mechanical vibrations are minimized by slightly yieldable stator supports which are accurately adjustable to insure a uniform air gap between rotor and stator. A factor of importance is the support of the rotor end of the spindle by a stabilizing bearing which is supported by a cushion constructed and arranged so that such bearing can take load and be properly lubricated without applying any bending moment to the spindle, thereby preserving alignment of the spindle and avoiding whip and vibration. The mounting of the fan is such as to minimize any tendency to unbalance the spindle while providing more efficient air circulation and cooling of the whole assembly. To these ends and also to improve generally upon devices of the character indicated, the invention consists in the various matters hereinafter described and claimed. In its broader aspects the invention is not necessarily limited to the specific construction selected for illustrative purposes in the accompanying drawings in which Fig. 1 is a plan view.

Fig. 2 is a vertical central section.

Fig. 3 is a left hand end view.

Fig. 4 is a section taken on line 4—4 of Fig. 3.

Fig. 5 is an enlarged section of an element of Fig. 4.

Fig. 6 is an end view of one of the three stator supports.

Figure 7:
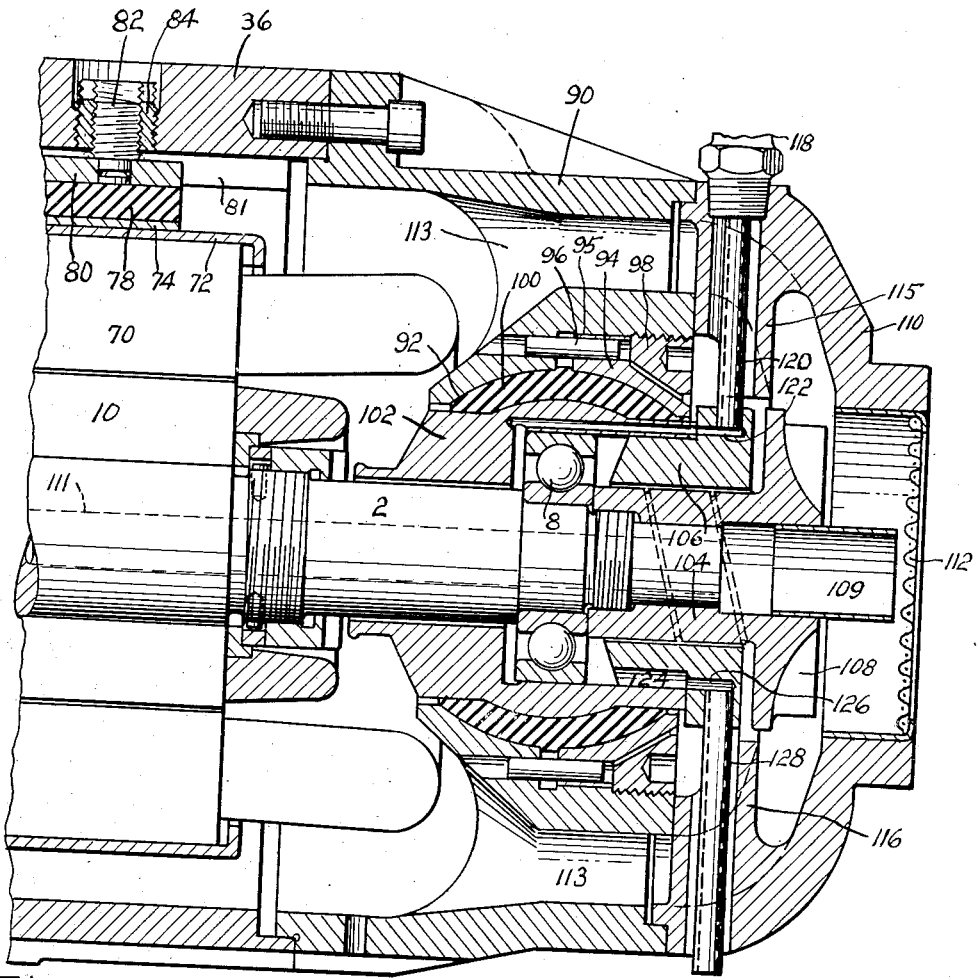
Fig. 7 is a sectional view enlarged of a portion of Fig. 2.
Figure 8:
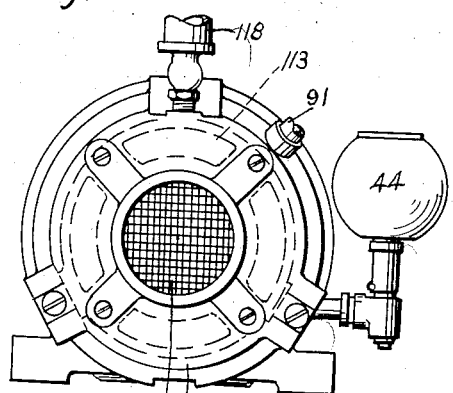
Fig. 8 is a right hand end view.
Figure 9:
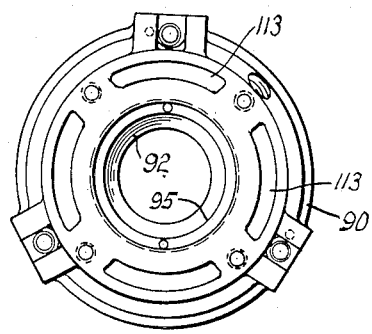
Fig. 9 is a right hand end view of an extension casing.

A spindle 2 is intended to carry a grinding wheel or the like at one end and is journalled in three sets of bearings 4, 6 and 8 while being rotated by a motor whose rotor 10 is clamped to the spindle. The inner race rings of the bearings 4 are clamped against a shoulder on the spindle by a nut 12. The outer race rings are secured by a cap 14 which is externally polygonal next to a groove, an inverted U-shaped shield 16 being secured to the cap in surrounding relation to an inturned flange 18 on the nut to exclude foreign matter. The outer race rings of the two sets of ball bearings 4 and 6 fit in an externally tapered quill or bearing housing 20, a spacer 22 and a washer 24 being interposed. Coil springs 26 between the spacer and the washer urge them apart to preload the bearings. A nut 28 clamps the inner race rings of the bearings 6 and has an inturned flange 30 overlying a groove in a cap 32 which is bolted to the housing. A sheet metal shield 34 encloses the cap to insure against leakage of oil and conducts any such oil to a series of drain holes 35 in the cap from which the oil will go to a groove and a drain hole in the main housing 36.

The main casing 36 has a conical recess to receive the externally conical quill or bearing housing 20 which is held from rotation by a key 37. Across the top of the bearing housing is a slot to receive an eccentric 38 on the lower end of a rotatable stud 40 which has a flange adapted to be clamped in a recess by a nut 42. By turning the stud in one direction the bearing housing can be drawn into the main casing and the stud can then be locked by the nut. By turning the stud in the opposite direction, the bearing housing can be loosened without any necessity for pounding it axially to drive it out. An oiler 44 at the rear of the main casing directs oil through suitable ports to an annular groove 46 in the bearing housing 20 from which (Fig. 4) inclined openings or ports 48 direct the oil to two pairs of wicks 50 which bear at their upper ends against conical surfaces 52 on the spindle. The conical surfaces deliver small quantities of oil to the bearings. Each wick is carried by a slidable sleeve 54 which is urged upwardly by a coil spring 56 which abuts against a screw plug 58 threaded in the lower end of a guide sleeve 60. Each guide sleeve is threaded in the bearing housing and has radial ports 61 leading to a space around the corresponding wick.

To prevent a possible building up of air pressure by the rotating surfaces or by expansion and contraction of the air due to heat which might tend to induce leakage, the pressure in the bearing chamber and outside of it is equalized by a breather. This comprises radial holes 62 in the spacer 22 leading to radial holes 64 in the bearing housing, the radial ports being connected by a longitudinal port 66 which communicates by radial ports with a pipe 68 having a strainer or filter to exclude dust.

The stator 70 of the motor has a flanged enclosing shell 72 of circular form. Three sets of equally spaced vibration absorbing and radially adjustable supports locate the stator concentric with the rotor. These supports are located 120° apart within the casing opposite to similarly located pads or external enlargements 73, one support being at the top as indicated. The supports are radially deep but narrow circumferentially of the housing so that considerable space exists between them for cooling air. Each support comprises a flanged plate 74 having a central tongue 76 entering a key slot in the stator shell to prevent rotation. Each plate 74 is bonded to resilient cushioning material 78 such as a block of natural rubber which is also bonded to a plate 80 which enters a longitudinal groove 81 in the main housing. A pair of shouldered screws 82 (Fig. 7) are secured at their ends to each plate 80 and are threaded in internally and externally threaded bushings or differential nuts 84 which are slotted across the top. The internal threads are of different pitch from the external ones so that a fine and accurate adjustment of the stator can be effected to insure its concentricity with the rotor and a consequently uniform air gap. After adjustment, solder may be run into the recesses above the screws to maintain the adjustment. The rubber is under compression and yieldably supports the stator radially and circumferentially against electrical and mechanical reactions so that vibration is damped.

At one end of the main casing 36 (see Fig. 7) is bolted an extension casing 90 carrying a conduit 91 for the electric wiring and having an internal seat 92 which is a spherical segment. Another spherical segment is formed by a plate 94 which is accurately centered in a cylindrical recess 95 of the casing 90 and held from rotation by dowel pins 96 which are driven into holes of the casing 90. A nut 98 locks the plate 94 in a position wherein its spherical segment is concentric with the segment 92. Within the spherical segments is contained a moulded cushion 100 of rubber or other plastic material having flow characteristics and vibration absorbing qualities similar to those of processed rubber. The cushion is in the form of a parti-spherical ring or sleeve and surrounds a spherical segment between cylindrical surfaces on a bearing housing 102. The cushion is not wholly confined but can flow or bulge outwardly in the annular space between the spherical segments and into the small clearance spaces at its ends. The bearing housing 102 is permitted a very small self-aligning or lateral centering movement without placing any bending moment on the spindle, the compressed cushion being able to flow like a liquid under pressure so that pressure against the bearing housing remains uniform all around it. The stabilizing bearing 8 will thus support radial load without that load having any tendency to bend or displace the spindle laterally from the axis of rotation which is determined by the preloaded bearings 4 and 6. There is no metal to metal contact between the bearing housing and its support and vibrations are absorbed. The spherical form of the cushion helps to insure uniform flow. Natural rubber is a suitable material for the cushion 100 and for the cushions 78, its flow characteristics being predictable and reliable as distinguished from most synthetic varieties.

The outer race ring of the stabilizing bearing has a sliding fit in its housing to provide for expansion and contraction of the spindle and the inner race ring is clamped by an internally threaded portion on the extended hub 104 of a removable fan which is sleeved on a reduced extension of the spindle 2 and acts as a nut. A removable cap 106 is bolted to the housing 102 and has a sleeve portion entering the housing and surrounding the fan hub with a clearance, there being a spiral thread on the fan hub to inhibit leakage of oil. The fan has radial blades 108 cut in its flanged end opposite to an opening in an end plate 110 bolted to the casing 90. A strainer or filter 112 for the incoming air is placed in the opening. The cooling air then is driven through four openings 113 in the casing 90, then between the widely spaced stator supports as well as through the air gap between rotor and stator and out through a series of longitudinal ports 114 in that part of the main casing which encloses the bearings 4 and 6. Additional air to cool the spindle and rotor may be obtained as indicated in Fig. 2 wherein a short tube 109 projects forwardly from the fan and conducts air to a spindle bore 111 having radial exit ports beyond the rotor.

The end plate 110 has a pair of diametrically opposite hollow bosses 115 and 116 around which the air travels to the openings 113 in the casing 90. An oil feeder 118 has a flexible delivery pipe 120 passing loosely through the upper boss 115 into a hole in the cap 106 where it communicates with aligned ports 122 extending longitudinally through the bearing housing 102 into the bearing chamber at one side of the bearing 8. The cap 106 has a notch 124 at the bottom leading to a port 126 from which a drain pipe 128 extends down with clearance through the lower boss 116 to the outside of the end plate. The drain pipe and passages also form a breather to equalize pressure in the bearing chamber. The delivery pipe 120 is composed of flexible material such as synthetic rubber in order that no appreciable force or load will be transmitted to the spindle to disturb its alignment. The conduits are uninterrupted so that oil cannot leak and come in contact with the rubber cushion 100 to damage it.

Servicing of the unit and disassembly is convenient while keeping the bearings protected. The tapered quill or bearing housing 20 will come out endwise with the spindle 2, its bearings 4 and 6 and its rotor 10, the rear stabilizing bearing 8 remaining in its housing 102 when released from the spindle by removal of the fan which is accessible through the filter opening.

I claim:

1. In a spindle mounting and driving unit, a supporting casing, a spindle journalled in the casing and supporting a rotor, a stator around the rotor, a plurality of yieldable supports for the stator, and means for moving the supports radially with a fine adjustment to compress the yieldable supports between the casing and the stator and to locate the stator in concentric relation to the rotor.

2. In a spindle mounting and driving unit, a supporting casing, a spindle journalled in the casing and supporting a rotor, a stator around the rotor, yieldable supports for the stator, each support being mounted on the supporting casing for movement radially against the stator to compress the yieldable support, and differential screw means for moving the supports.

3. In a spindle mounting and driving unit, a supporting casing, a spindle journalled in the casing and supporting a rotor, a stator around the rotor, vibration absorbing supports for the stator, each support comprising a pair of plates and an interposed block of cushioning material, and means for placing the block under compression between the supporting casing and the stator.

4. In a spindle mounting and driving unit, a supporting casing, a spindle journalled in the casing and supporting a rotor, a stator around the rotor, vibration absorbing supports for the stator, each support comprising a pair of plates and an interposed block of cushioning material bonded to the plates, one of the plates being keyed to the stator and the other being keyed to the casing, and means for individually moving the supports radially against the stator.

5. In a spindle mounting and driving unit, a supporting casing, a spindle journalled in the casing and supporting a rotor, a stator around the rotor, radially adjustable stator supports mounted for individual radial adjustment upon the interior of the supporting casing and widely spaced about the stator to provide openings between them of large area outside of the stator, and a fan on the spindle for forcing air through the openings.

6. In a spindle mounting and driving unit, a supporting casing, a spindle journalled in the casing and supporting a rotor, a stator around the rotor, stator supports spaced about the stator and providing openings of large area therebetween, the stator supports being secured to the interior of the supporting casing, a fan on the spindle for forcing air between the stator supports, and the body of the casing having longitudinal openings connecting the interior of the supporting casing with the atmosphere to discharge air forced through the spaces between the stator supports.

7. In a spindle mounting and driving unit, a supporting casing, a spindle journalled in the casing and supporting a rotor, a stator around the rotor, stator supports spaced about the stator and providing openings of large area therebetween, one end of the supporting casing having an air inlet from the atmosphere, a fan on the end of the spindle adjacent to the inlet for forcing air between the stator supports, and the spindle having an air passage extending between the inlet and the more remote end of the rotor.

8. In a spindle mounting and driving unit, a supporting casing, a spindle having a rotor in the casing, spindle bearings in the ends of the supporting casing beyond the ends of the rotor, a stator around the rotor, stator supports spaced about the stator and providing openings of large area therebetween, the stator supports being secured to the interior of the supporting casing, the body of the casing having passages outside of the bearings and extending longitudinally through the casing to the atmosphere from the region of the stator, the opposite end of the supporting casing having an air inlet from the atmosphere, and a fan on the spindle adjacent to the inlet for forcing atmosphere air between the stator supports and through the casing passage to the atmosphere.

9. In a spindle mounting and driving unit, a motor, a casing having a compartment for the motor and antifriction bearings at opposite ends of the motor, a spindle journalled in the bearings and driven by the motor, the casing having longitudinal air passages extending from the motor compartment to the ends of the casing, and means for driving air through the passages and the compartment from one end of the casing to the other.

10. In a spindle mounting and driving unit, a motor, a casing having a compartment for the motor and antifriction bearings at opposite ends of the motor, a spindle journalled in the bearings and driven by the motor, the casing having longitudinal air passages extending from the motor compartment to the ends of the casing, means for driving air through the passages and the compartment from one end of the casing to the other, and the stator of the motor having spaces between it and the casing at least as large in area as the passages through the casing.

11. In a spindle mounting and driving unit, a motor, a casing having a compartment for the motor and antifriction bearings at opposite ends of the motor, a spindle journalled in the bearings and driven by the motor, and means for cooling the bearings and the motor, said means comprising air passages extending longitudinally through the casing outside of the bearings and connecting the motor compartment with the atmosphere at both ends thereof, and a fan on the end of the spindle to drive air through the passages from one end of the casing to the other.

12. In a spindle mounting and driving unit, a motor, a casing having a compartment for the motor and antifriction bearings at opposite ends of the motor, a spindle journalled in the bearings and driven by the motor, the casing having a plurality of longitudinal air passages therethrough outside of the bearings and communicating with the atmosphere, the spindle having a passage extending from one end to the motor compartment, the casing having an air inlet at one end, and a fan on the end of the spindle adjacent to the inlet to drive air through the casing passages and the spindle passage.

CLARENCE C. STEVENS.

REFERENCES CITED

The following references are of record in the file of this patent:

UNITED STATES PATENTS

| Number | Name | Date |
|---|---|---|
| Re. 22,161 | Grobel | Aug. 18, 1942 |
| 1,688,891 | Spreen | Oct. 23, 1928 |
| 1,832,368 | Ell | Nov. 17, 1931 |
| 1,860,883 | Bilde | May 31, 1932 |
| 1,870,237 | Chervenka | Aug. 9, 1932 |
| 1,884,573 | Chapman | Oct. 25, 1932 |
| 1,903,855 | Townsend | Apr. 18, 1933 |
| 1,939,848 | Haushalter | Dec. 19, 1933 |
| 2,039,547 | Mikulic | May 5, 1936 |
| 2,320,843 | Baudry | June 1, 1943 |